United States Patent
Tanner et al.

(10) Patent No.: US 9,266,615 B2
(45) Date of Patent: *Feb. 23, 2016

(54) OUTFLOW VALVE HAVING FLEXIBLE BELLMOUTH AND CABIN PRESSURE CONTROL SYSTEM EMPLOYING THE SAME

(75) Inventors: Justin A. Tanner, Queen Creek, AZ (US); Albert Kang, Chandler, AZ (US); David P. Gentile, Chandler, AZ (US); Bill Facinelli, Phoenix, AZ (US); Kevin Jones, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1161 days.

This patent is subject to a terminal disclaimer.

(21) Appl. No.: 12/689,068

(22) Filed: Jan. 18, 2010

(65) Prior Publication Data

US 2011/0177770 A1    Jul. 21, 2011

(51) Int. Cl.
*B64C 1/14* (2006.01)
*B64D 13/04* (2006.01)

(52) U.S. Cl.
CPC ..................... *B64D 13/04* (2013.01)

(58) Field of Classification Search
CPC ........................................ B64C 1/14
USPC ........................................ 454/74
See application file for complete search history.

(56) References Cited

U.S. PATENT DOCUMENTS

| | | | |
|---|---|---|---|
| 3,387,804 A * | 6/1968 | Rhines | 244/129.5 |
| 3,426,984 A * | 2/1969 | Emmons | 244/117 R |
| 3,740,006 A | 6/1973 | Maher | |
| 4,583,704 A | 4/1986 | Krauss et al. | |
| 5,279,109 A | 1/1994 | Liu et al. | |
| 5,396,760 A | 3/1995 | Hines | |
| 6,050,527 A * | 4/2000 | Hebert et al. | 244/210 |
| 6,116,541 A * | 9/2000 | Chuang et al. | 244/129.4 |
| 7,185,853 B2 * | 3/2007 | Kelnhofer et al. | 244/129.5 |
| 7,198,062 B2 | 4/2007 | Hoffman et al. | |
| 8,840,451 B2 * | 9/2014 | Royalty et al. | 454/74 |
| 2010/0096503 A1 * | 4/2010 | Tanner et al. | 244/129.4 |
| 2010/0291852 A1 * | 11/2010 | Steinert et al. | 454/71 |
| 2012/0064813 A1 * | 3/2012 | Horner et al. | 454/71 |
| 2013/0266441 A1 * | 10/2013 | Enevoldsen | 416/1 |

* cited by examiner

*Primary Examiner* — Steven B McAllister
*Assistant Examiner* — Samantha Miller
(74) *Attorney, Agent, or Firm* — Ingrassia Fisher & Lorenz, P.C.

(57) ABSTRACT

Embodiments of an outflow valve are provided for use in conjunction with an actuator. In one embodiment, the outflow valve includes a frame and a first door rotatably coupled to the frame and configured to be moved by the actuator between an open position and a closed position. The first door includes: (i) a main body, (ii) a bellmouth fixedly coupled to the main body, and (iii) a plurality of longitudinally-spaced slots formed through the bellmouth and increasing the flexibility thereof.

20 Claims, 5 Drawing Sheets

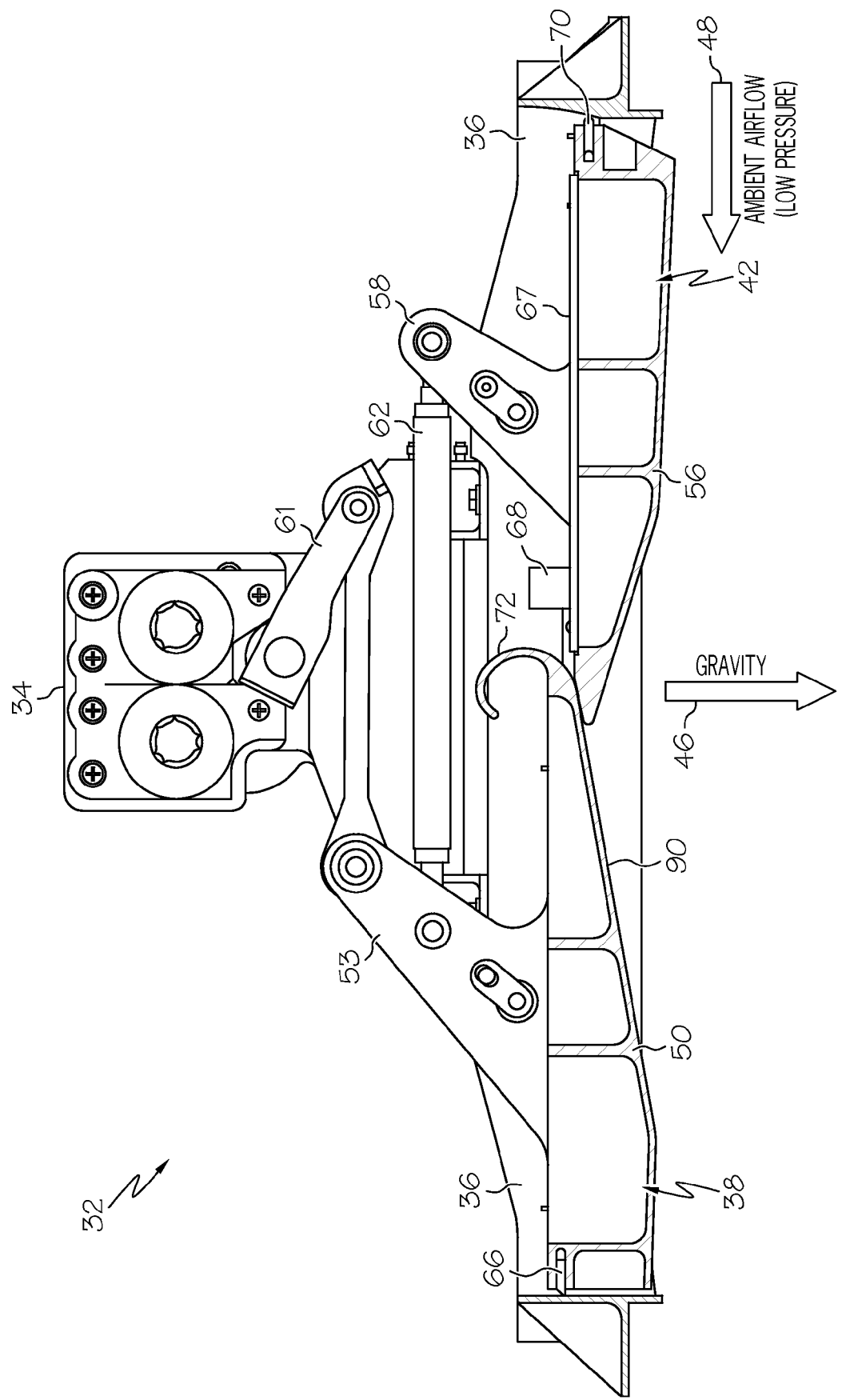

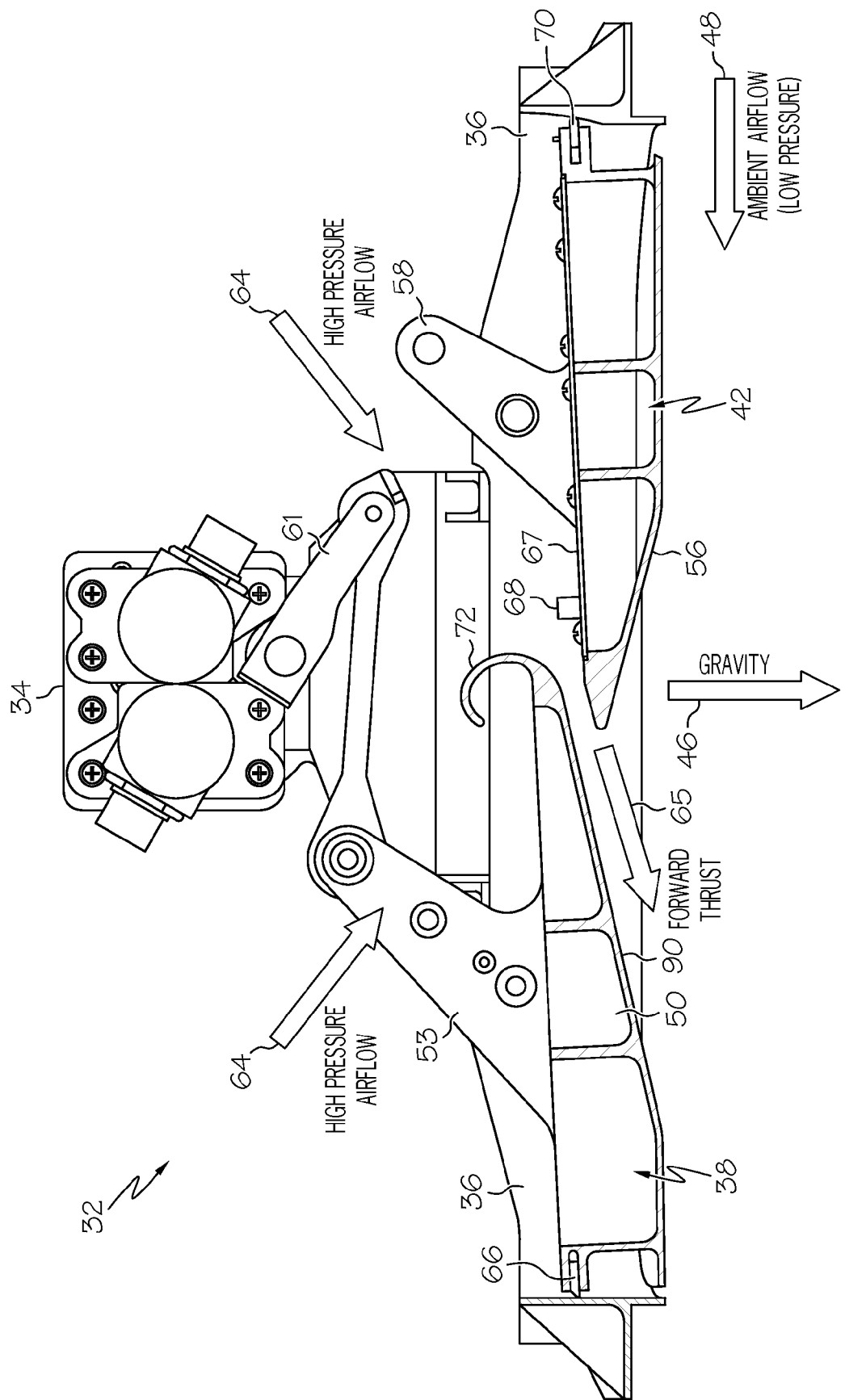

OUTFLOW VALVE HAVING FLEXIBLE BELLMOUTH AND CABIN PRESSURE CONTROL SYSTEM EMPLOYING THE SAME

TECHNICAL FIELD

The present invention relates generally to aircraft systems and, more particularly, to embodiments of an outflow valve having a flexible bellmouth well-suited for deployment within a cabin pressure control system.

BACKGROUND

Cabin Pressure Control Systems (CPCSs) commonly include an outflow valve, such as a multi-door outflow valve, which is modulated during flight to maintain cabin air pressure within a desired range. The multi-door outflow valve may include, for example, a frame, a first door (e.g., a first rectangular butterfly plate) pivotally mounted to a first portion of the frame, and a second door (e.g., a second rectangular butterfly plate) pivotally mounted to a second portion of the frame. The multi-door outflow valve may be mounted in the aircraft fuselage such that the first door is closer to the tail of the aircraft than is the second door; for this reason, the first door and the second door may be referred to as the "aft door" and the "forward door," respectively. The aft and forward doors may be mechanically linked by one or more linkages and move in unison between a closed position and a partially open or "cruise" position. In the closed position, the aft and forward doors sealingly engage one another and an inner periphery of the frame to generally prevent pressurized air from escaping the fuselage. In the cruise position, the aft and forward doors permit pressurized airflow from the aircraft's fuselage to the aircraft's external environment (referred to herein as "ambient.") The outflow valve may also be positioned to provide additional forward thrust to the aircraft when in the cruise position (commonly referred to as "thrust recovery").

It has been found that, by affixing a curved or cylindrical bellmouth to the inner end of the aft door, the likelihood of development of downstream vortices can be decreased under cruise conditions to lessen the production of acoustic tones. However, as conventionally designed and implemented, the addition of an aft door bellmouth has certain limitations. First, vortices can still develop when the outflow valve is in the cruise position, which may result in the production of undesirable tonal noises. More significantly, the addition of an aft door bellmouth can greatly increase the rigidity of the aft door. Due to this increase in rigidity, the aft door may be hindered from deflecting in conjunction with the more-flexible forward door, which tends to deflect or bulge outward during pressure loading of the outflow valve. A sizable leakage gap can thus form between the aft door and the forward door in the closed position, and significant leakage can occur. Although a door-to-door seal (e.g., a polymeric strip) can be mounted to the aft door to reduce leakage through the outflow valve in the closed position, the addition of such a door-to-door seal increases part count, complexity, and overall cost of the outflow valve, and can decrease the thrust output of the outflow valve in the cruise position.

There thus exists an ongoing need to provide embodiments of an outflow valve suitable for deployment within a cabin pressure control system that overcomes the above-described limitations. In particular, it would be desirable to provide an outflow valve (e.g., a multi-door outflow valve) that includes a door-mounted bellmouth (e.g., an aft door bellmouth) and that provides quiet operation, relatively high thrust output in the cruise position, and low leakage in a closed position. Other desirable features and characteristics of the present invention will become apparent from the subsequent detailed description of the invention and the appended claims, taken in conjunction with the accompanying drawings and this background of the invention.

BRIEF SUMMARY

Embodiments of an outflow valve are provided for use in conjunction with an actuator. In one embodiment, the outflow valve includes a frame and a first door rotatably coupled to the frame and configured to be moved by the actuator between an open position and a closed position. The first door includes: (i) a main body, (ii) a bellmouth fixedly coupled to the main body, and (iii) a plurality of longitudinally-spaced slots formed through the bellmouth and increasing the flexibility thereof.

Embodiments of a cabin pressure control system are further provided for deployment aboard an aircraft including a cabin. In one embodiment, the cabin pressure control system includes a controller, an actuator operatively coupled to the controller, and an outflow valve configured to be fluidly coupled between the cabin and an ambient pressure. The outflow valve includes a frame, a forward door rotatably coupled to the frame and mechanically coupled to the actuator, and an aft door rotatably coupled to the frame and mechanically coupled to the actuator. The aft door is configured to move in conjunction with the forward door between an open position and a closed position when driven by the actuator. The aft door includes: (i) a main body including an inner sealing edge configured to sealingly engage the forward door in the closed position, and (ii) a bellmouth fixedly coupled to the main body proximate the inner sealing edge and having a plurality of longitudinally-spaced slots formed therethrough. The plurality of longitudinally-spaced slots increases the flexibility of the bellmouth to improve sealing of the aft door against the forward door in the closed position.

BRIEF DESCRIPTION OF THE DRAWINGS

At least one example of the present invention will hereinafter be described in conjunction with the following figures, wherein like numerals denote like elements, and:

FIGS. 3 and 4 are side cross-sectional views of the exemplary outflow valve shown in FIG. 2 in a closed position and a partially open cruise position, respectively, as taken along line 3-3 (identified in FIG. 2);

DETAILED DESCRIPTION

The following Detailed Description is merely exemplary in nature and is not intended to limit the invention or the application and uses of the invention. Furthermore, there is no intention to be bound by any theory presented in the preceding Background or the following detailed description.

Figure 1:
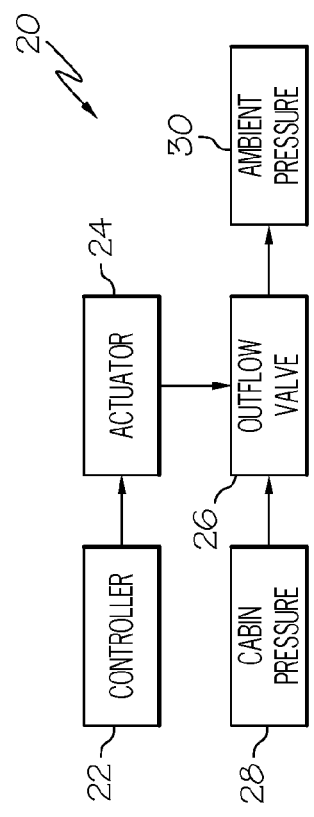
FIG. 1 is a generalized block diagram of an exemplary Cabin Pressure Control System (CPCS)

FIG. 1 is a functional block diagram of an exemplary Cabin Pressure Control Systems (CPCS) 20 suitable for deployment onboard an aircraft. In this particular example, CPCS comprises three main components, namely, a controller 22, an actuator 24, and an outflow valve 26. Outflow valve 26 is fluidly coupled between an aircraft's cabin or fuselage (represented in FIG. 1 by block 28) and a low pressure sink, such as ambient (represented in FIG. 1 by block 30). In one specific implementation, outflow valve 26 is mounted through a wall of the aircraft's fuselage, preferably in the rear underbelly of the aircraft proximate the tail. As will be further discussed below, outflow valve 26 may be positioned so as to provide additional forward thrust to the host aircraft when venting pressurized air from the aircraft's cabin (block 28) to ambient (block 30).

Controller 22 is operatively (e.g., electrically) coupled to actuator 24, which is, in turn, mechanically coupled to outflow valve 26. During operation of CPCS 20, controller 22 commands actuator 24 to move outflow valve 26, and more specifically at least one valve element included within outflow valve 26, between a fully closed position and an open position (referred to herein as the "cruise position"). By actively modulating outflow valve 26 in this manner, controller 22 maintains the aircraft cabin pressure (block 28) within a desired range during flight. Controller 22 may command actuator 24 to modulate outflow valve in accordance with a predetermined schedule or, perhaps, as a function of one or more operational criteria; e.g., as a function of cabin pressure (block 28) as monitored by a non-illustrated pressure sensor operatively coupled to controller 22.

Figure 2:
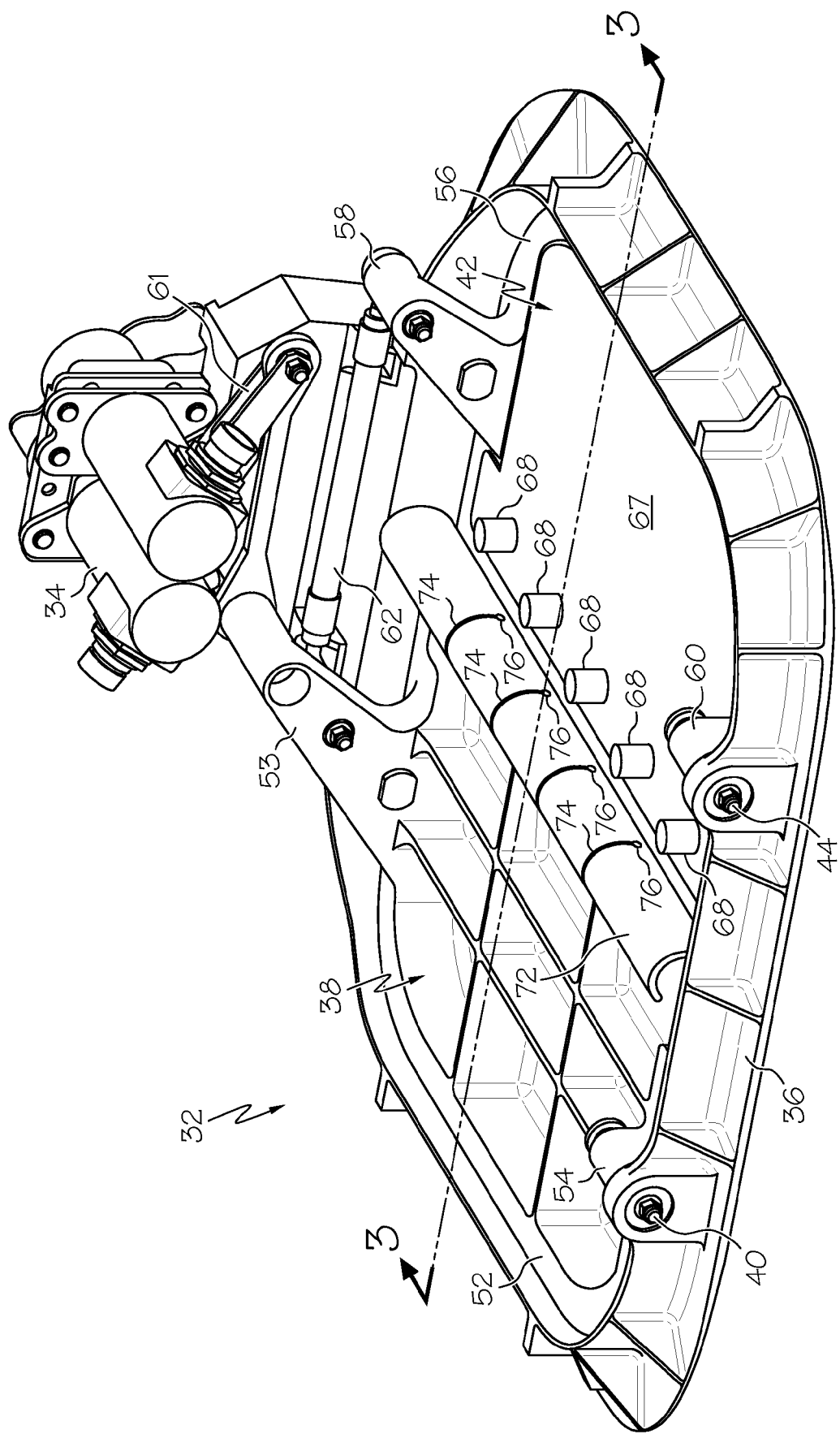
FIG. 2 is a front isometric view of an outflow valve suitable for deployment within the CPCS shown in FIG. 1 in accordance with an exemplary embodiment.

FIG. 2 is an isometric view of a multi-door outflow valve 32 and an actuator 34 in accordance with an exemplary embodiment. Outflow valve 32 and actuator 34 are suitable for use as outflow valve 26 and actuator 24, respectively, shown in FIG. 1. Outflow valve 32 includes a frame 36, a first door 38 (e.g., a rectangular butterfly plate) rotatably mounted to a first portion of frame 36 (indicated in FIG. 2 at pivot 40), and a second door 42 (e.g., a rectangular butterfly plate) rotatably mounted to a second portion of frame 36 (indicated in FIG. 2 at pivot 44). In the illustrated exemplary embodiment, actuator 34 assumes the form of first and second electrical drive motors, which are each mounted to outer peripheral portion of frame 36. Frame 36 is configured to be affixed (e.g., bolted) to a mounting structure provided on an aircraft. For example, and as previously stated, frame 36 may be mounted through a wall of an aircraft fuselage. In a preferred embodiment, outflow valve 32 is mounted through the aircraft's underbelly proximate the aircraft's tail such that first door 38 is closer to the aircraft's tail than is second door 42. For this reason, first door 38 and second door 42 will be referred to herein as "aft door 38" and "forward door 42," respectively.

Aft door 38 includes a main, plate-like body 52 and first and second arms 53 and 54, which extend outwardly from body 52 proximate pivot 40. Similarly, forward door 42 includes a main, plate like body 56 and first and second arms 58 and 60, which extend from body 56 proximate pivot 44. In the exemplary embodiment shown in FIG. 2, a backing plate 67 is affixed (e.g., bolted) to main body 56 of forward door 42. Actuator 34 is mechanically coupled to arm 53 of aft door 38 via a master linkage 61 (e.g., a bell crank linkage). In addition, arm 53 of aft door 38 is mechanically linked to arm 58 of forward door 42 via a first slave link 62. Although not shown in FIG. 2 for clarity, arm 54 of aft door 38 may likewise be mechanically linked to arm 60 of forward door 42 via a second slave link. Collectively, arm 53, arm 58, and slave link 62 form a linkage that enables actuator 34 to simultaneously move aft and forward doors 38 and 42 between a closed position and an open or cruise position as shown and described below in conjunction with FIGS. 3 and 4. If desired, outflow valve 32 may also be provided with one or more rows of noise abatement projections or pegs 68, which extend outwardly from backing plate 67 near the inner sealing edge of aft door 38. When pressurized air flows through outflow valve 32 in the cruise position, noise abatement pegs 68 condition the pressurized airflow through valve 32 to help minimize the production of noise.

FIGS. 3 and 4 are side cross-sectional view of outflow valve 32 in a closed position and an open cruise position, respectively, as taken along line 3-3 (identified in FIG. 2). As can be seen in FIGS. 3 and 4, aft door 38 caries a first wiper seal 66, which extends around the outer sealing periphery of aft door 38 (i.e., the three sides of aft door 38 adjacent frame 36). Forward door 42 is likewise equipped with a wiper seal 70, which may extend around the outer sealing periphery of forward door 42 (i.e., the three sides of forward door 42 adjacent frame 36). Seals 66 and 70 may each be partially embedded within (e.g., dovetail with) mating slots provided in aft and forward doors 38 and 42. If desired, seals 66 and 70 may each be energized by a wave spring or other suitable means. Seals 66 and 70 may be formed from various conventionally-known polymeric materials including, for example, extruded silicone or polytetrafluoroethylene (e.g., Teflon®). Seals 66 and 70 may each be single piece or multi-piece seals. Alternative embodiments of outflow valve 32 may not include one or more of seals 66 and 70 depending upon desired sealing characteristics.

When outflow valve 32 is moved into the cruise position shown in FIG. 4, pressurized air flows from the aircraft fuselage, through doors 38 and 42, and to ambient (represented in FIG. 4 by arrows 64). Outflow valve 32 is preferably designed such that pressurized airflow through aft and forward doors 38 and 42 occurs in a relatively smooth and quiet manner. In addition, when utilized for thrust recovery, outflow valve 32 preferably encourages rapid airflow therethrough to optimize thrust output (represented in FIG. 4 by arrow 65). Therefore, to promote relatively smooth airflow through outflow valve 32 in the cruise position (FIG. 4), a bellmouth 72 is fixedly coupled to aft door 38. As shown in FIGS. 2-4, bellmouth 72 comprises a generally curved (e.g., cylindrical) wall that is fixedly coupled to (e.g., integrally formed with or mounted to) main body 52 of aft door 38 proximate the inner sealing edge of aft door 38 (i.e., the edge of aft door 38 that sealingly engages forward door 42 in the closed position). In contrast to conventional bellmouths, bellmouth 72 includes a plurality of openings therethrough (e.g., a plurality of longitudinally-spaced slots and/or a plurality of longitudinally-spaced apertures) that increase the flexibility of bellmouth 72 and enable aft door 38 to better flex in conjunction with forward door 42 during pressure loading as described below in conjunction with FIGS. 5 and 6.

Figure 5:
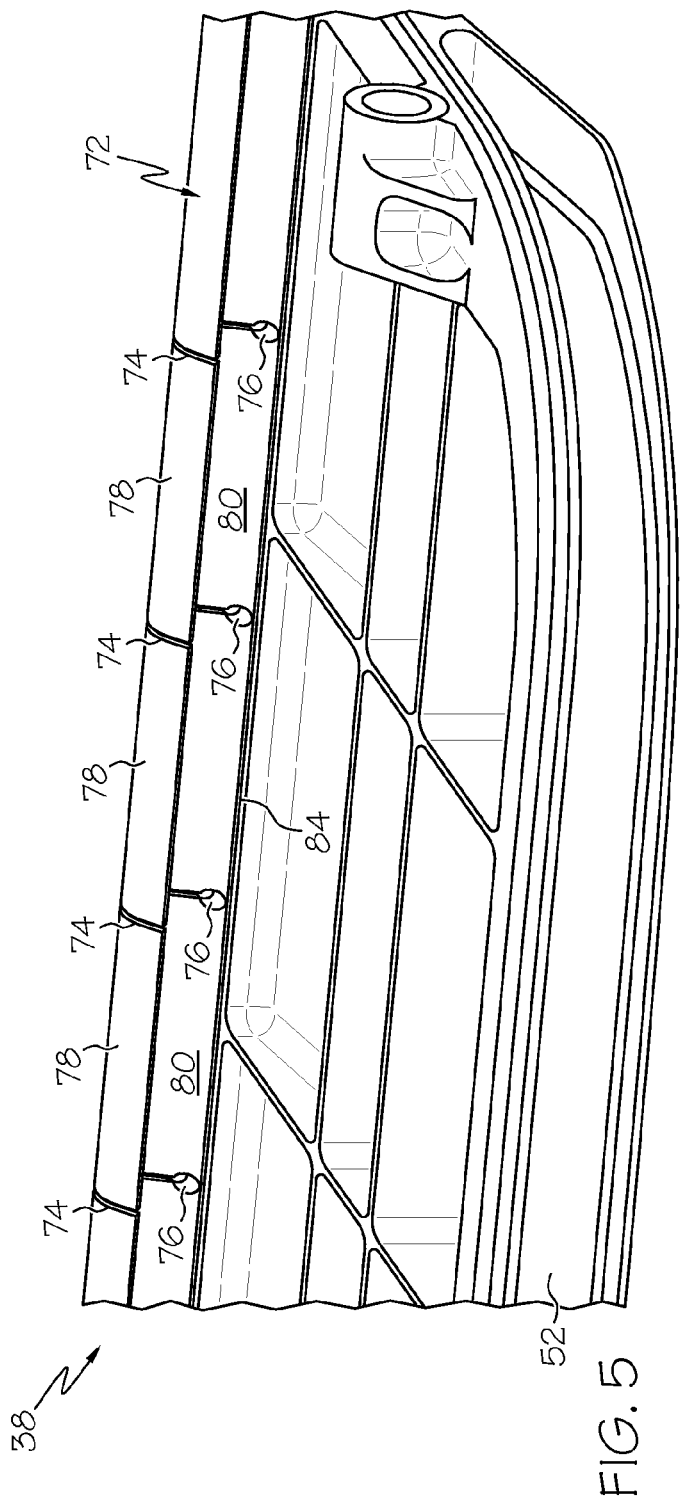
FIG. 5 is a rear isometric view of the aft door bellmouth included within the exemplary outflow valve shown in FIGS. 2-4.
Figure 6:
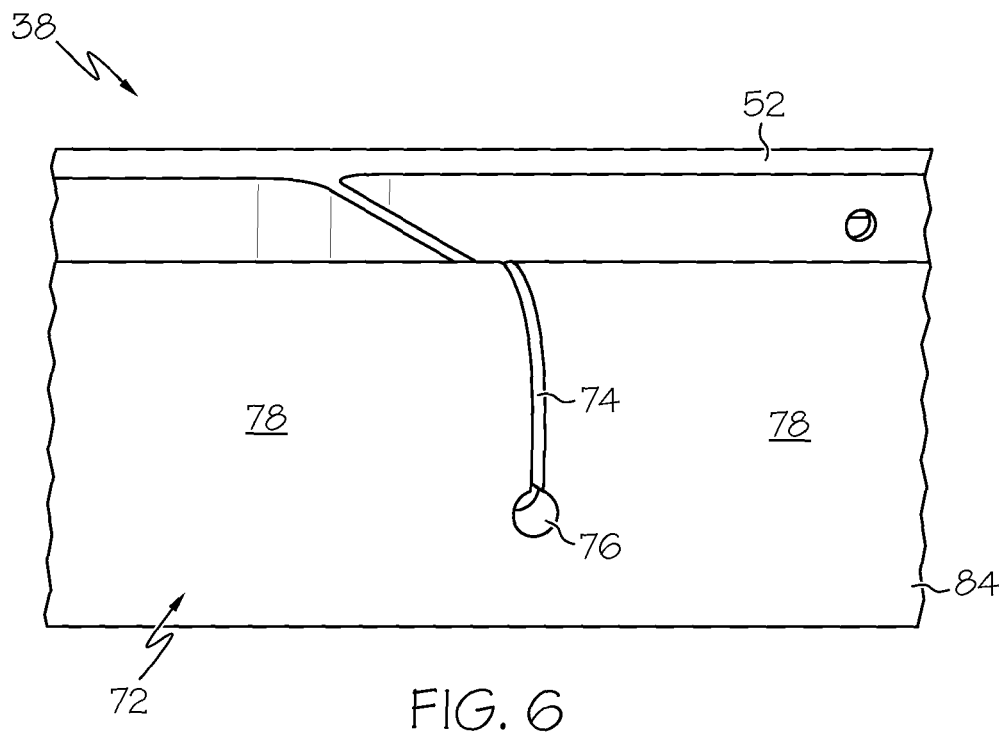
FIGS. 6 and 7 are front isometric views of a portion of the aft door bellmouth shown in FIGS. 2-5 in non-deflected and deflected states, respectively.

FIGS. 5 and 6 are rear and front isometric views, respectively, of aft door 38 and bellmouth 72 (a representative section of aft door 38 and bellmouth 72 is shown in FIG. 6). As can be seen in FIGS. 5 and 6, aft door bellmouth 72 includes a curved out surface 78, a curved inner surface 80 (identified in FIG. 5), an outer longitudinal edge 82 (identified in FIG. 5), and an inner longitudinal portion 84. As indicated above, inner longitudinal portion 84 of bellmouth 72 is fixedly coupled to the end portion of aft door body 52. For example, in embodiments wherein bellmouth 72 and aft door body 52 are formed as a single machined piece, inner longitudinal portion 84 may be integrally formed with the end portion of aft door body 52. Alternatively, in embodiments wherein bellmouth 72 is formed (e.g., cast) as one or more separate pieces, inner longitudinal portion 84 may be affixed to aft door body 58 utilizing a conventionally-known attachment technique, such as welding. A plurality of longitudinally-spaced slots 74 is formed through bellmouth 72. Each longitudinally-spaced slot 74 extends through bellmouth 72 from outer curved surface 78 to inner curved surface 80. Furthermore, as shown most clearly in FIG. 5, longitudinally-spaced slots 74 each extend through outer longitudinal edge 82, through an intermediate longitudinal portion of bellmouth 72, and terminate within inner longitudinal portion 84 of bellmouth 72 adjacent aft door body 58 to divide bellmouth 72 into a plurality of longitudinal segments. Slots 74 each extend partially around the longitudinal axis of bellmouth 72; and, due to the curved shape of bellmouth 72, slots 74 each have a substantially arcuate or C-shaped geometry.

In the illustrated example, four longitudinally-spaced slots 74 are formed through bellmouth 72, the lateral spacing between slots 74 is substantially equivalent, and each slot 74 has a substantially uniform width. However, in alternative embodiments, the number of longitudinally-spaced slots 74 can be varied as desired, the spacing between slots 74 may not be consistent, and slots 74 may assume other geometries, such as tapered or V-shaped geometries. The number, disposition, geometry, and dimensions of slots 74 will typically be chosen, at least in part, to impart aft door 38 with a deflection profile that closely matches that of forward door 42 (FIGS. 2-4). For example, in embodiments wherein the inner sealing edge of forward door 42 assumes an elliptical or parabolic shape under pressure loading conditions, the innermost slots 74 may be spaced more closely than the outermost slots 74 to impart the sealing edge of aft door 38 with a similar elliptical or parabolic shape when aft door 38 deflects due to pressure loading. The number, disposition, geometry, and dimensions of slots 74 may also be selected, at least in part, to compensate for asymmetries inherent in the structural design of aft door 38. While slots 74 are substantially identical in the illustrated exemplary embodiment, this need not be the case in alternative embodiments.

As noted above, longitudinally-spaced slots 74 increase the flexibility of bellmouth 72 and, therefore, the flexibility of aft door 38. Slots 74 thus enable aft door 38 to better flex in conjunction with forward door 42, which tends to deflect or bulge outward when outflow valve 32 is subject to pressure loading in the closed position (FIGS. 2 and 3). By enabling aft door 38 to better flex in conjunction with forward door 42, slots 74 minimize or eliminate the formation of a leakage gap between aft door 38 and forward door 42 in the closed position (FIGS. 2 and 3). Consequently, undesired leakage through outflow valve 32 can be significantly reduced, and low leakage requirements can be satisfied without the provision of a door-to-door seal commonly employed by conventional outflow valves thereby reducing the complexity, cost, and part count of outflow valve 32 relative to conventional outflow valves of the type described above.

Although by no means necessary, a plurality of longitudinally-spaced apertures can be formed through bellmouth 72 in addition, or in lieu of, longitudinally-spaced slots 74. In the exemplary embodiment illustrated in FIGS. 5 and 6, a plurality of longitudinally-spaced apertures 76 is formed through inner longitudinal portion 84 of bellmouth 72 proximate aft door body 52. Each longitudinally-spaced aperture 76 connects with a different longitudinally-spaced slot 74 formed through bellmouth 72. Stated differently, slots 74 each extend from outer longitudinal edge 82 of bellmouth 72 to a different aperture 76 and terminate therein. During deflection of aft door 38 and bellmouth 72, longitudinally-spaced slots 74 help to distribute stress more evenly through the parent material of bellmouth 72. In so doing, longitudinally-spaced slots 74 reduce localized fatigue within bellmouth 72 and increase the operational lifespan of outflow valve 32. Slots 74 also help to further increase the flexibility of bellmouth 72 and thereby enable aft door 38 to better flex in conjunction with forward door 42 as previously described. Although the size and shape of apertures 76 will vary amongst different embodiments, it is generally preferred that longitudinally-spaced apertures 76 each have a substantially rounded (e.g., a circular or elliptical) shape and a diameter greater than the width of its corresponding longitudinally-spaced slot 74. In the exemplary embodiment illustrated in FIGS. 5 and 6, each longitudinally-spaced aperture 76 cooperates or combines with a different longitudinally-spaced slot 74 to form a keyhole-shaped opening through bellmouth 72.

In addition to providing more uniform stress distribution during deflection of bellmouth 72 and/or enhancing the flexibility of bellmouth 72, longitudinally-spaced apertures 76 may also perform a noise suppression function. More specifically, apertures 76 may be positioned to direct a number of air jets slightly upstream of the airflow gap created between aft door 38 and forward door 42 when outflow valve 32 is in the cruise position (FIG. 4); e.g., each aperture 76 may be formed along an axis that is substantially parallel to the outer planar face of aft door 38 (identified in FIGS. 3 and 4 at 90). The air jets created by longitudinally-spaced apertures 76 disrupt vortices that may otherwise develop and produce undesirable acoustic tones as pressurized air flows through outflow valve 32. Thus, by discouraging the development of such noise-producing vortices, apertures 76 help outflow valve 32 operate in a quiet manner during venting of pressurized air. In a preferred embodiment, longitudinally-spaced apertures 76 are formed through bellmouth 72 such that the longitudinal axes of apertures 76 are interspersed with noise abatement pegs 68 (FIG. 2) when outflow valve 32 is in a closed position (FIGS. 2 and 3).

Longitudinally-spaced slots 74 and longitudinally-spaced apertures 76 can be formed in bellmouth 72 utilizing one or more conventionally-known fabrication processes. For example, in embodiments wherein bellmouth 72 is cast as one or more separate pieces, slots 74 and apertures 76 may be directly cast in bellmouth 72 as voids or negative mold features. This notwithstanding, it is generally preferred that bellmouth 72 is initially formed as a unitary machined piece, and that slots 74 and/or apertures 76 are subsequently created in bellmouth 72 via the removal of material; i.e., that slots 74 and/or apertures 76 are formed as "cut-outs." As one specific example, bellmouth 72 may first be formed as a unitary machined piece, apertures 76 may be drilled into bellmouth 72, and slots 74 may then be cut into bellmouth 72 utilizing a milling machine, such as a five axis computer numerical control mill. Alternatively, and as a second example, longitudinally-spaced slots 74 (and, possibly, apertures 76) may be formed in bellmouth 72 utilizing an electrical discharge machining process.

Figure 7:
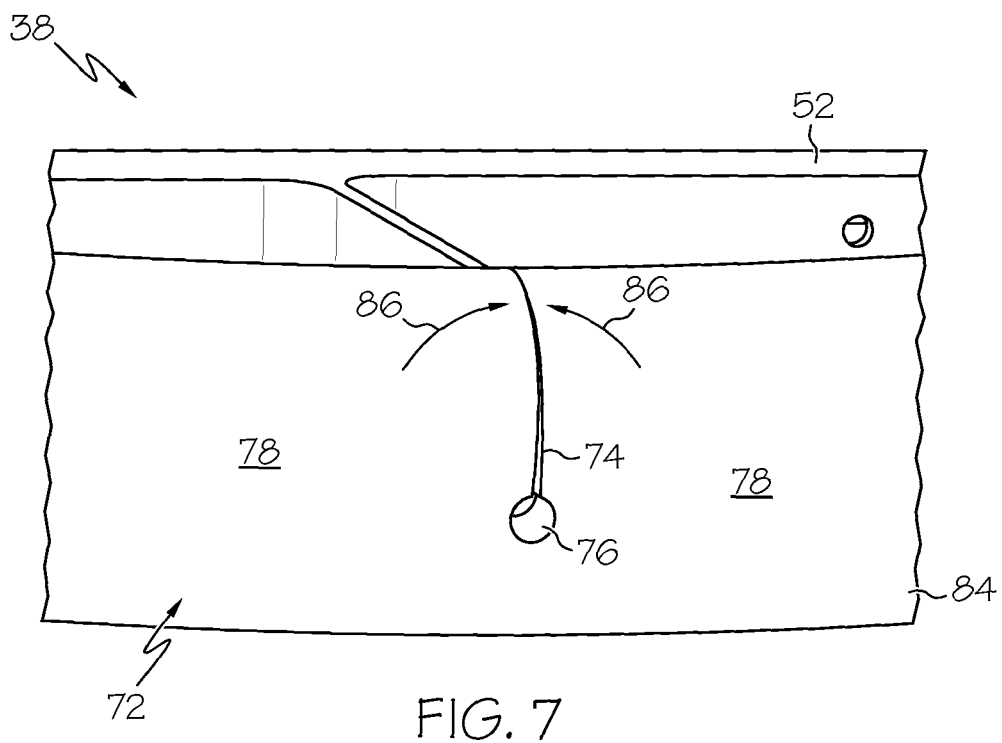

As noted above, longitudinally-spaced slots 74 increase the flexibility of bellmouth 72 and, in so doing, enable aft door 38 to better deflect in conjunction with forward door 42 during pressure loading of outflow vale 32. In certain embodiments, longitudinally-spaced slots 74 may also serve as a hard stop feature. In such embodiments, the spacing between the sidewalls defining longitudinally-spaced slots 74 may be selected to impart bellmouth 72 with a two-phase deflection profile wherein bellmouth 72 deflects with relative little pressure loading until reaching a predetermined deflection threshold, at which point bellmouth 72 provides relatively high structural resistance to further deflection. To further illustrate this point, FIG. 7 depicts a representative section of bellmouth 72 after bellmouth 72 has reached a predetermined deflection threshold during pressure loading of outflow valve 32. As may be appreciated by comparing FIG. 7 to FIG. 6, longitudinally-spaced slots 74 have facilitated the deflection or outward bending of bellmouth 72 from the non-deflected position shown FIG. 6 to the deflected position shown in FIG. 7. In deflected position shown in FIG. 7, the opposing sidewalls of slot 74 furthest from aft door 38 have converged or pinched together (indicated in FIG. 7 by arrows 86). Bellmouth 72, and therefore aft door 38, will thus provide a significantly greater resistance to further deflection beyond the deflected position shown in FIG. 7.

It should thus be appreciated that there has been provided an exemplary embodiment of a multi-door outflow valve including a flexible (e.g., slotted) bellmouth that provides quite quiet operation, optimal thrust production in the cruise position, and little to no leakage when the outflow valve is subjected to pressure loading in a closed position. While described above in the context of an exemplary cabin pressure control system (i.e., CPCS 20 shown in FIG. 1), it should be appreciated that embodiments of the outflow valve may be utilized in various other avionic and non-avionic applications wherein it is desirable to provide smooth fluid flow through the outflow valve in a partially open position and wherein improved sealing characteristics are desired. In such alternative applications, the outflow valve may be utilized to regulate the flow of fluids other than pressurized air. Furthermore, although the above-described exemplary outflow valve employed two (i.e., forward and aft) pivotable doors, alternative embodiments of the outflow valve may include any suitable number of pivotable doors or other such valve elements. In embodiments wherein the outflow valve includes a single door rotatable coupled to the frame, the sealing edge of the door may sealingly engage another component of the outflow valve (e.g., a portion of the frame) in the closed position.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An outflow valve for use in conjunction with an actuator, the outflow valve comprising:
    a frame; and
    a first door rotatably coupled to the frame and configured to be moved by the actuator between an open position and a closed position, the first door comprising:
        a main body having an inner sealing edge;
        a bellmouth fixedly coupled to the main body adjacent the inner sealing edge, the bellmouth comprising a curved wall extending away from the main body in a direction substantially opposite the inner sealing edge and curling back toward the main body, the bellmouth having an outer longitudinal edge; and
        a plurality of longitudinally-spaced slots formed through the bellmouth and increasing the flexibility thereof, the plurality of longitudinally-spaced slots extending through at least the outer longitudinal edge of the bellmouth to generally divide the bellmouth into a plurality of longitudinal segments.

2. An outflow valve according to claim 1 wherein the bellmouth has a curved inner surface and a curved outer surface, and wherein the plurality of longitudinally-spaced slots extends from the curved outer surface to the curved inner surface.

3. An outflow valve according to claim 1 wherein the plurality of longitudinally-spaced slots each extend partially around the longitudinal axis of the bellmouth.

4. An outflow valve according to claim 1 wherein the bellmouth further comprises an inner longitudinal portion fixedly coupled to the main body, the longitudinally-spaced slots extending from the outer longitudinal edge to the inner longitudinal portion.

5. An outflow valve according to claim 4 wherein the bellmouth further comprises a plurality of longitudinally-spaced apertures formed through the bellmouth.

6. An outflow valve according to claim 5 wherein the plurality of longitudinally-spaced apertures is formed through the inner longitudinal portion of the bellmouth proximate the main body.

7. An outflow valve according to claim 5 wherein the outflow valve further comprises a second door rotatably coupled to the frame, and wherein an airflow gap is formed between the first door and the second door in the open position.

8. An outflow valve according to claim 7 wherein the longitudinally-spaced apertures are each configured to direct an air jet upstream of the airflow gap when pressurized air flows through the outflow valve in the open position.

9. An outflow valve according to claim 5 wherein the plurality of longitudinally-spaced slots each extend from the outer longitudinal edge to a different one of the plurality of longitudinally-spaced apertures.

10. An outflow valve according to claim 9 wherein the plurality of longitudinally-spaced slots cooperates with the plurality of longitudinally-spaced apertures to form a plurality of keyhole-shaped openings through the bellmouth.

11. An outflow valve according to claim 9 wherein the plurality of longitudinally-spaced apertures each have a diameter greater than the width of each of the longitudinally-spaced slots.

12. An outflow valve for use in conjunction with an actuator, the outflow valve comprising:
    a frame;
    a forward door rotatably coupled to the frame and configured to be mechanically coupled to the actuator; and
    an aft door rotatably coupled to the frame and configured to be mechanically coupled to the actuator, the aft door configured to move in conjunction with the forward door between an open position and closed position when driven by the actuator, the aft door comprising:
        a main body including an inner sealing edge configured to sealingly engage the forward door in the closed position; and
        a bellmouth fixedly coupled to the main body proximate the sealing edge; and
        a plurality of longitudinally-spaced openings formed through the bellmouth, the plurality of longitudinally-spaced openings increasing the flexibility of the bellmouth to improve sealing of the aft door against the forward door during pressure loading of the outflow valve in the closed position;

wherein the bellmouth comprises a curved wall extending from the main body in a direction substantially opposite the inner sealing edge, and wherein the plurality of longitudinally-spaced openings generally divides at least a portion of the bellmouth into a plurality of successive longitudinal segments.

13. An outflow valve according to claim 12 wherein the plurality of longitudinally-spaced openings comprises a plurality of longitudinally-spaced slots formed through the bellmouth.

14. An outflow valve according to claim 13 wherein the plurality of longitudinally-spaced openings further comprises a plurality of longitudinally-spaced apertures formed through the bellmouth proximate the main body.

15. An outflow valve according to claim 14 wherein the bellmouth comprises an outer longitudinal edge, and wherein each of the plurality of longitudinally-spaced slots extends from the outer longitudinal edge to a different one of the plurality of longitudinally-spaced apertures.

16. An outflow valve according to claim 15 wherein the bellmouth further comprises an inner longitudinal portion fixedly coupled to the main body, the plurality of longitudinally-spaced apertures formed through the inner longitudinal portion.

17. An outflow valve, comprising:
a frame; and
a first door rotatably coupled to the frame and movable between a cruise position and a closed position, the first door comprising:
a main body having an inner sealing edge;
a bellmouth joined to the main body adjacent the inner sealing edge, the bellmouth comprising a curved wall having a longitudinal axis and an outer longitudinal edge; and
a plurality of C-shaped slots formed in the bellmouth and extending partially around the longitudinal axis, the plurality of C-shaped slots extending from the outer longitudinal edge of the bellmouth toward, but not to the inner sealing edge of the main body.

18. An outflow valve according to claim 17 further comprising a plurality of apertures formed through the bellmouth, the plurality of C-shaped slots extending to the plurality of apertures to form a plurality of keyhole-shaped openings in the bellmouth.

19. An outflow valve according to claim 17 further comprising a second door rotatably coupled to the frame and having an end portion contacting the inner sealing edge of the first door when in the closed position, the inner sealing edge located between bellmouth and the end portion of the second door when the first door is in the closed position.

20. An outflow valve according to claim 17 wherein the plurality of C-shaped slots comprises outermost slots and innermost slots, and wherein the spacing between the innermost slots is less than the spacing between the outermost slots to impart the inner sealing edge of the first door with a substantially parabolic shape when subject to pressure loading.

* * * * *